(12) United States Patent
Chitragar et al.

(10) Patent No.: US 12,139,355 B2
(45) Date of Patent: Nov. 12, 2024

(54) VARIABLE BRAKING SYSTEMS AND DEVICES

(71) Applicant: GOODRICH CORPORATION, Charlotte, NC (US)

(72) Inventors: Venkatesh Chitragar, Bengaluru (IN); Vinayak Vijaya Chandran, Bengaluru (IN)

(73) Assignee: GOODRICH CORPORATION, Charlotte, NC (US)

( * ) Notice: Subject to any disclaimer, the term of this patent is extended or adjusted under 35 U.S.C. 154(b) by 951 days.

(21) Appl. No.: 17/122,304

(22) Filed: Dec. 15, 2020

(65) Prior Publication Data

US 2022/0097985 A1     Mar. 31, 2022

(30) Foreign Application Priority Data

Sep. 30, 2020 (IN) .............................. 202041042564

(51) Int. Cl.
| | |
|---|---|
| B65G 13/075 | (2006.01) |
| B64D 9/00 | (2006.01) |
| B65G 67/00 | (2006.01) |
| F16D 57/00 | (2006.01) |
| F16D 121/28 | (2012.01) |

(52) U.S. Cl.
CPC ............. B65G 67/00 (2013.01); B64D 9/003 (2013.01); F16D 57/002 (2013.01); *B64D 2009/006* (2013.01); *F16D 2121/28* (2013.01)

(58) Field of Classification Search
CPC ...... B65G 13/075; B65G 67/00; B64D 9/003; B64D 2009/006; F16D 57/002; F16D 2121/28

USPC ....................................................... 193/35 A
See application file for complete search history.

(56) References Cited

U.S. PATENT DOCUMENTS

| | | | |
|---|---|---|---|
| 3,557,925 A | 1/1971 | Zulauf | |
| 3,561,578 A | 2/1971 | Goodwin et al. | |
| 5,642,804 A * | 7/1997 | Kellis ................... | B65G 23/26 |
| | | | 198/832.2 |

(Continued)

FOREIGN PATENT DOCUMENTS

| | | |
|---|---|---|
| EP | 0937643 | 8/1999 |
| KR | 2006033465 | 4/2006 |

(Continued)

OTHER PUBLICATIONS

European Patent Office; European Search Report dated Mar. 29, 2022 in Application No. 21200193.7.

*Primary Examiner* — Douglas A Hess
(74) *Attorney, Agent, or Firm* — SNELL & WILMER L.L.P.

(57) ABSTRACT

A brake roller assembly may comprise: a shaft; a first roller bearing coupled to the shaft and disposed at a first axial end of the shaft a second roller bearing coupled to the shaft and disposed at a second axial end of the shaft; a roller cylinder disposed radially outward of the first roller bearing and the second roller bearing; and a braking arrangement, including a plurality of electrodes, and a plurality of rotor disks coupled to the roller cylinder, each rotor disk in the plurality of rotor disks disposed between an anode in the plurality of electrodes and a cathode in the plurality of electrodes.

7 Claims, 7 Drawing Sheets

(56) References Cited

U.S. PATENT DOCUMENTS

| | | | | |
|---|---|---|---|---|
| 6,131,717 | A * | 10/2000 | Owen | B65G 13/075 |
| | | | | 188/82.1 |
| 7,021,456 | B2 * | 4/2006 | Haan | B65G 13/075 |
| | | | | 198/781.01 |
| 8,186,501 | B2 | 5/2012 | Wolkerstorfer | |
| 9,889,990 | B2 * | 2/2018 | Dimitrov | B65G 13/06 |
| 10,023,387 | B2 * | 7/2018 | Harms | B65G 13/071 |
| 10,882,698 | B2 * | 1/2021 | Shivalinga | F16D 55/38 |
| 11,053,078 | B1 * | 7/2021 | Stegmiller | B65G 13/00 |
| 11,124,364 | B1 * | 9/2021 | Chitragar | B64D 9/00 |
| 11,261,029 | B2 * | 3/2022 | Shivalinga | B65G 13/075 |
| 11,535,453 | B2 * | 12/2022 | Gopan | B64D 9/00 |
| 11,643,273 | B1 * | 5/2023 | Ramezani | B01F 35/717 |
| | | | | 193/35 A |
| 11,772,899 | B2 * | 10/2023 | Harms | B65G 13/06 |
| | | | | 198/780 |
| 11,870,370 | B2 * | 1/2024 | Chitragar | B65G 13/075 |

FOREIGN PATENT DOCUMENTS

| | | |
|---|---|---|
| KR | 2006100838 | 9/2006 |
| WO | 2015049405 | 4/2015 |
| WO | 2018197080 | 11/2018 |

* cited by examiner

VARIABLE BRAKING SYSTEMS AND DEVICES

CROSS-REFERENCE TO RELATED APPLICATIONS

This application is a non-provisional of, and claims priority to, and the benefit of India Provisional Application No. 202041042564 with DAS Code 7DA9, entitled "VARIABLE BRAKING SYSTEMS AND DEVICES," filed on Sep. 30, 2020, which is hereby incorporated by reference in its entirety.

FIELD

The disclosure relates generally to reactive load braking, and more particularly, to systems and devices for load reactive braking in cargo movement.

BACKGROUND

Rollers, casters, and other wheeled mechanisms are often used to move loads. For heavy loads, the rollers may have an associated braking mechanism to prevent loss of control. In cargo loading systems, for example, braking rollers may have the brake arrangement preset at or near the maximum braking load that is selected for a maximum weight cargo container at the maximum angle of the cargo floor. In most cases, the strong brakes on the rollers are too powerful to allow the roller to roll under light loads. Braking rollers often have a friction material around the outer surface. In instances where the load applied to the roller is not enough to overcome the braking mechanism, the container skids over the roller and creates flat spots on the roller.

SUMMARY

A brake roller assembly is disclosed herein. A brake roller assembly may comprise: a shaft; a first roller bearing coupled to the shaft and disposed at a first axial end of the shaft a second roller bearing coupled to the shaft and disposed at a second axial end of the shaft; a roller cylinder disposed radially outward of the first roller bearing and the second roller bearing; and a braking arrangement, including a plurality of electrodes, and a plurality of rotor disks coupled to the roller cylinder, each rotor disk in the plurality of rotor disks disposed between an anode in the plurality of electrodes and a cathode in the plurality of electrodes.

In various embodiments, the brake roller assembly may further comprise a cavity defined between the shaft and the roller cylinder, wherein the cavity is configured to receive a fluid. The fluid may be an electro-rheological fluid. The brake roller assembly may further comprise a stator disk having a piezoelectric material, wherein the piezoelectric material is configured to act as a power source for the plurality of electrodes. The anode and the cathode may be configured to create an electric field therebetween. The brake roller assembly may further comprise a plurality of skewed rollers, wherein each rotor disk in the plurality of rotor disks is disposed between a first skewed roller in the plurality of skewed rollers and a second skewed roller in the plurality of skewed rollers. The brake roller assembly may further comprise an axle disposed radially outward from the shaft and radially inward from the roller cylinder. The plurality of electrodes may be coupled to the axle.

A variable braking system for a cargo handling system is disclosed herein. The variable braking system may comprise: a tray comprising a first rail and a second rail; and a brake roller assembly, comprising: a shaft coupled to the first rail and the second rail; a roller cylinder disposed radially outward of the shaft and between the first rail and the second rail, the roller cylinder configured to rotate relative to the shaft, the roller cylinder and the shaft partially defining a cavity therebetween; a fluid disposed in the cavity, the fluid configured to change viscosity to vary a braking force of the brake roller assembly.

In various embodiments, the brake roller assembly further comprises a braking arrangement including a plurality of rotor disks and a plurality of electrodes, wherein the plurality of rotor disks are coupled to the roller cylinder, and the plurality of electrodes are configured to create an electric field to change the viscosity of the fluid. The variable braking system may further comprise a load cell coupled to the tray. The load cell may be configured to measure a weight of a cargo. The viscosity of the fluid may be varied based on the weight of the cargo. The variable braking system may further comprise a plurality of electrodes interleaved with a plurality of rotor disks. The variable braking system may further comprise a controller in electrical communication with the load cell and the plurality of electrodes, wherein the controller is configured to supply a voltage to the plurality of electrodes based on the weight of the cargo measured by the load cell.

A control system for a cargo handling system is disclosed herein. The control system may comprise: a voltage regulator; a load cell coupled to a tray of the cargo handling system; a brake roller assembly having a plurality of electrodes disposed therein; a controller coupled to the load cell and the plurality of electrodes, the controller operable to: receive, via the load cell, a weight measurement of a cargo; determine a desired viscosity based on the weight measurement and a desired braking force; command the voltage regulator to supply a desired voltage based on the desired viscosity to the plurality of electrodes.

In various embodiments, the brake roller assembly includes an electro-rheological fluid disposed therein. The electro-rheological fluid may change viscosity as the desired voltage changes. The brake roller assembly may include a braking arrangement. The braking arrangement may include a plurality of rotor disks coupled to a rotor cylinder. Each rotor disk in the plurality of rotor disks may be disposed axially between an anode in the plurality of electrodes and a cathode in the plurality of electrodes. The anode and the cathode may be configured to create an electric field in response to receiving the desired voltage from the voltage regulator.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In various embodiments, a braking roller assembly for use in a cargo handling system is disclosed herein. In various embodiments, the braking roller assembly may be configured to house an electro-rheological fluid, or the like. The braking roller assembly may be configured to provide a variable braking force based at least in part on a weight of a unit load device (ULD). In various embodiments, the electro-rheological fluid may be configured to change viscosity as a function of an electric field, or the like. Although described herein as including an electro-rheological fluid, any system configured to provide a variable braking force may be utilized. For example, a magno-rheological fluid could be utilized, a fluid that changes viscosity as a function of pressure could be utilized, or the like.

In various embodiments, a control system for a braking roller assembly is disclosed herein. In various embodiments, the control system may include a controller, a load cell, and the braking roller. In various embodiments, the controller can apply an electric field to the braking roller in response to a weight measurement received from the load cell. In this regard, a braking force may be varied based on the measured weight, in accordance with various embodiments.

Figure 1:
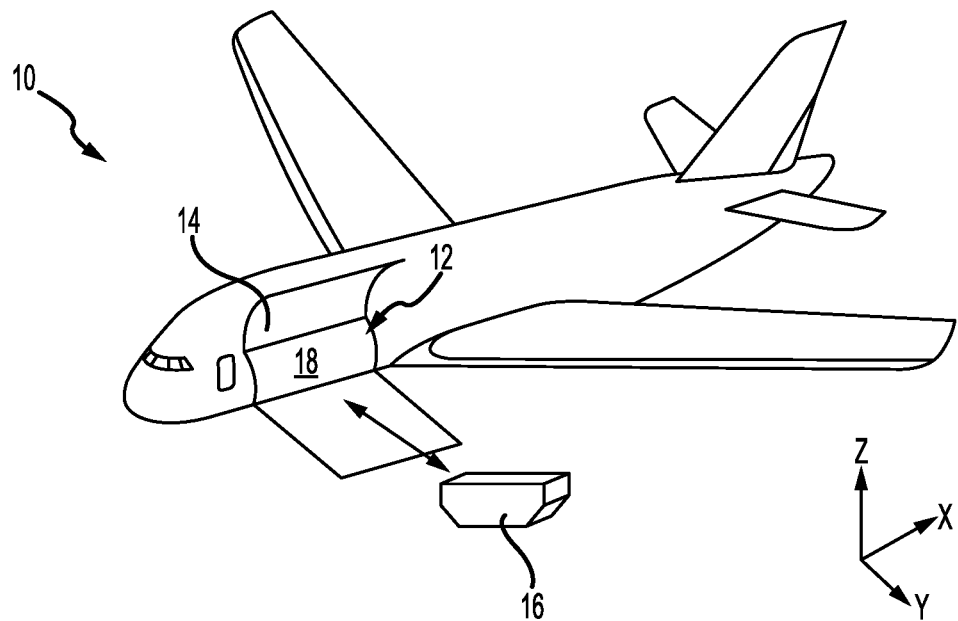
FIG. 1 illustrates an aircraft being loaded with cargo, in accordance with various embodiments.

With reference to FIG. 1, an aircraft 10 is illustrated having a cargo compartment 12. A cargo door 14 provides access to cargo compartment 12 from outside aircraft 10. Cargo 16 (e.g., pallets, ULDs, luggage, etc.) may be loaded and unloaded through cargo door 14 and onto a cargo deck 18 of aircraft 10. In various embodiments, cargo deck 18 may be equipped with one or more power drive units (PDUs) configured to propel cargo 16 across cargo deck 18 in a desired direction.

Figure 2:
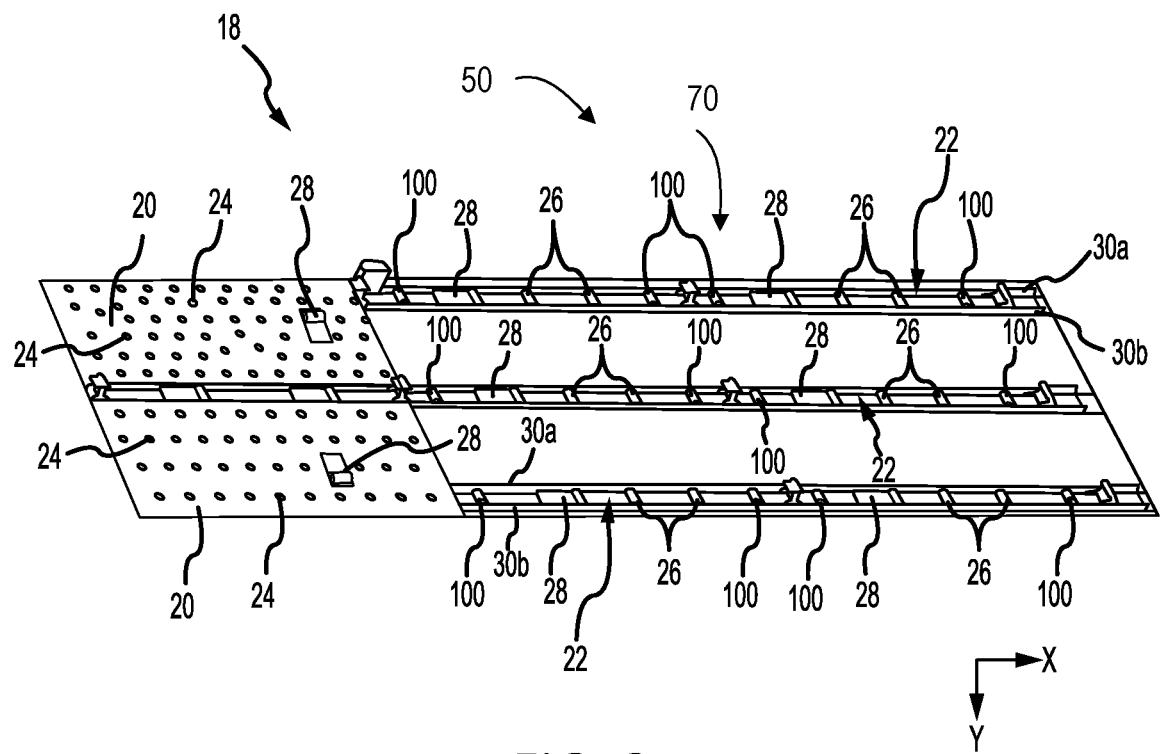
FIG. 2 illustrates a portion of an aircraft cargo deck, in accordance with various embodiments.

With reference to FIG. 2, a cargo handling system 50 including a portion of the cargo deck 18 is illustrated, in accordance with various embodiments. The cargo deck 18 may include one or more ball mats 20 and one or more roller trays 22. Ball mats 20 may include a plurality of freely rotating conveyance balls 24. Roller trays 22 include a plurality of freely rotating conveyance rollers 26. In various embodiments, a number of PDUs 28 may be mounted along cargo deck 18. For example, PDUs 28 may be located in ball mats 20 and/or in roller trays 22. PDUs 28 are configured to propel cargo over conveyance balls 24 and conveyance rollers 26 and across cargo deck 18.

In accordance with various embodiments, the cargo handling system 50 includes a variable braking system 70. The variable braking system 70 includes a number of brake rollers 100, which may be located along cargo deck 18. For example, brake roller 100 may be mounted in roller trays 22. Brake rollers 100 may be located between a first rail 30a and a second rail 30b of roller tray 22. Second rail 30b may be parallel to first rail 30a. In various embodiments, brake rollers 100 may also be located in ball mats 20. Brake rollers 100 are configured to rotate freely in a first circumferential direction (referred to herein as "default mode") and restrict rotation in the opposite circumferential direction (referred to herein as "braking mode"). In this regard, when in braking mode, brake rollers 100 may slow or prevent translation of cargo across cargo deck 18 in certain directions. In various embodiments, brake rollers 100 may be configured to slow or prevent cargo from translating in the forward direction.

Figure 3A:
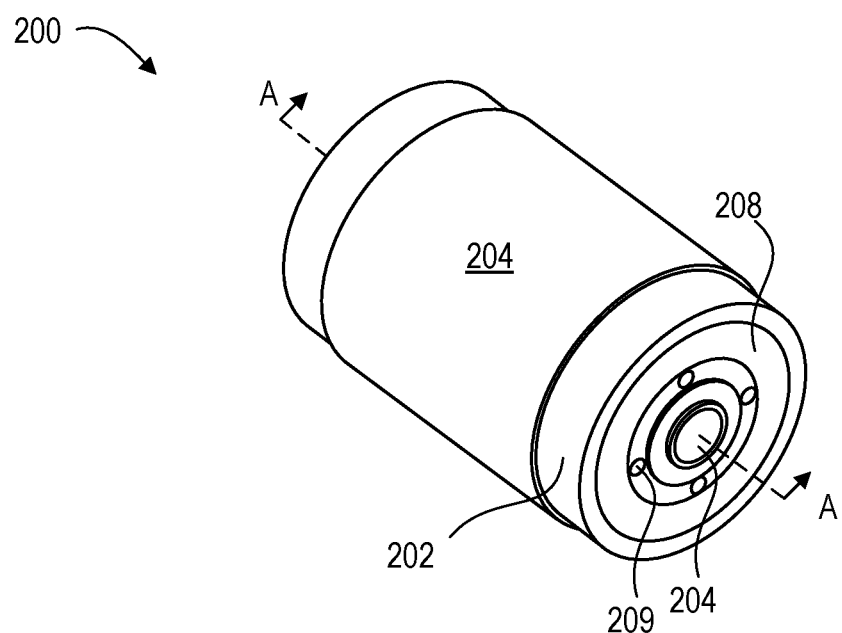
FIG. 3A illustrates a perspective view of a brake roller assembly, in accordance with various embodiments.

Referring now to FIG. 3A, a perspective view of a brake roller assembly 200 for use in a variable brake system 70 is illustrated, in accordance with various embodiments. In various embodiments, the brake rollers 100 may be in accordance with the brake roller assembly 200 as described further herein. The brake roller assembly 200 may comprise a roller cylinder 202, a tire 204, and a shaft 206. Tire 204 may be located around roller cylinder 202. Tire 204 is configured to provide a frictional surface to engage a bottom surface of cargo, such as cargo 16 in FIG. 1. In various embodiments, the roller cylinder 202 is configured to rotate relative to the shaft 206 in response to a cargo (e.g., cargo 16 from FIG. 1) moving relative to the cargo compartment.

In various embodiments, the brake roller assembly 200 further comprises a first spacer 208 and a first roller bearing 214. In various embodiments, the first spacer 208 is disposed radially between the first roller bearing 214 and the shaft 206. The first roller bearing 214 is disposed radially between the roller cylinder 202 and the first spacer 208. In various embodiments, first spacer 208 may include an aperture 207. The aperture 207 may be configured to receive a conductive wire therethrough, as described further herein. The roller cylinder 202 and the tire 204 are configured to rotate relative to the shaft 206 and the spacer 208.

Figure 3B:
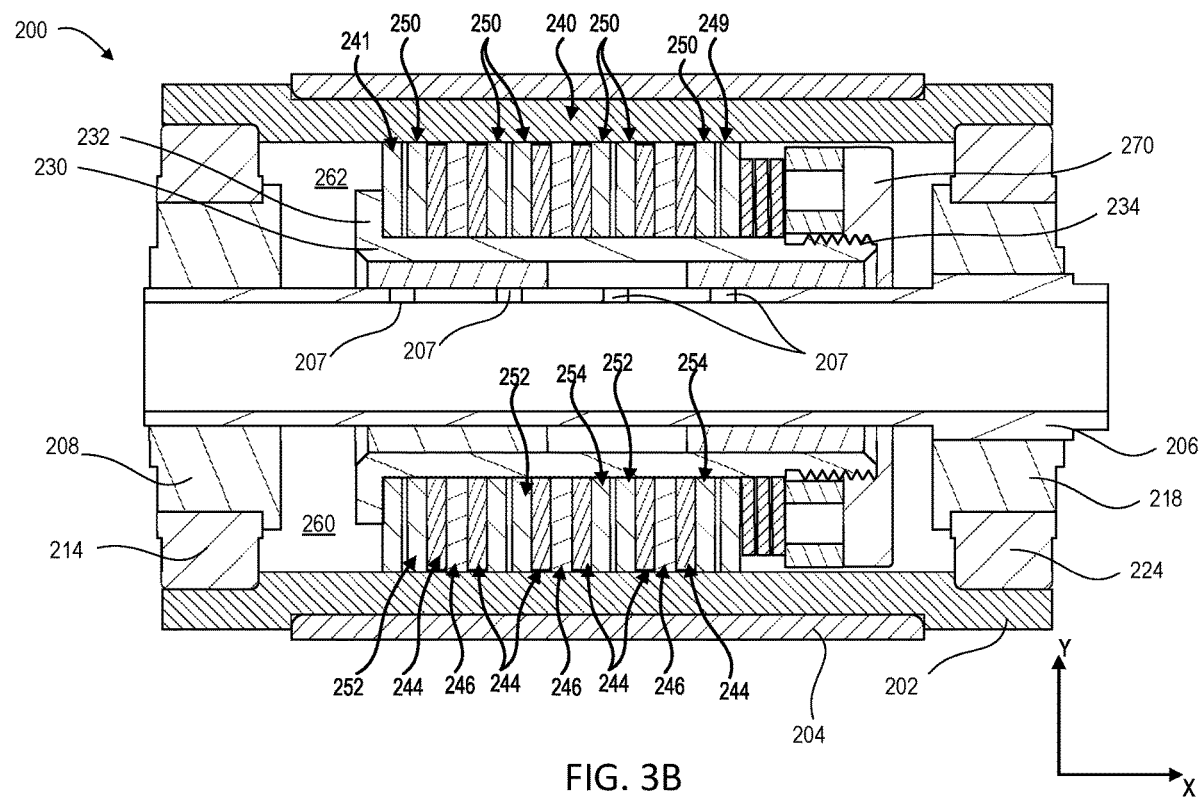
FIG. 3B illustrates a cross-sectional view of the brake roller assembly of FIG. 3A, in accordance with various embodiments.

Referring now to FIG. 3B, a cross-sectional view of the brake roller assembly 200 along section line A-A from FIG.

3A is illustrated in accordance with various embodiments. In various embodiments, the brake roller assembly 200 further comprises a second spacer 218 and a second roller bearing 224 disposed axially opposite the first spacer 208 and the first roller bearing 214. Similar to the first spacer 208, the second spacer 218 is disposed radially between the shaft 206 and the second roller bearing 224. Similar to the first roller bearing 214, the second roller bearing 224 is disposed between the second spacer 218 and the roller cylinder 202. The shaft 206 extends axially from the first spacer 208 to the second spacer 218.

In various embodiments, the brake roller assembly 200 further comprises an axle 230. In various embodiments, the axle 230 is fixedly coupled to the shaft 206 by any method known in the art, such as via a fastener, press fit, or the like. In various embodiments, the axle 230 remains stationary during operation of the brake roller assembly 200. In various embodiments, the axle 230 extends from a first axial end 232 to a second axial end 234. The second axial end 234 may be coupled to a nut 270.

In various embodiments, the brake roller assembly 200 comprises a braking arrangement 240 disposed axially between the first axial end 232 of the axle 230 and the nut 270. In various embodiments, the braking arrangement 240 may comprise a first electromagnetic shield 241, a second electromagnetic shield 249, a plurality of electrodes 250, a plurality of skewed rollers 244, and a plurality of rotor disks 246. In various embodiments, the first electromagnetic shield 241 is disposed at proximate the first axial end 232 of the axle 230 and the second electromagnetic shield 249 is disposed proximate the nut 270. In various embodiments, the plurality of electrodes 250 may act as stator plates in the braking arrangement 240.

In various embodiments, the plurality of electrodes 250 include a plurality of anodes 252 and a plurality of cathodes 254. In various embodiments, sandwiched between an anode from the plurality of anodes 252 and a cathode from the plurality of cathodes 254 is a first skewed roller from the plurality of skewed rollers 244, a rotor disk from the plurality of rotor disks 246, and a second skewed roller from the plurality of skewed rollers 244. In this regard, the braking arrangement 240 may be configured to provide friction, via the plurality of skewed rollers 244 as cargo (e.g., cargo 16 from FIG. 1) translates over the brake roller assembly 200.

Figure 4A:
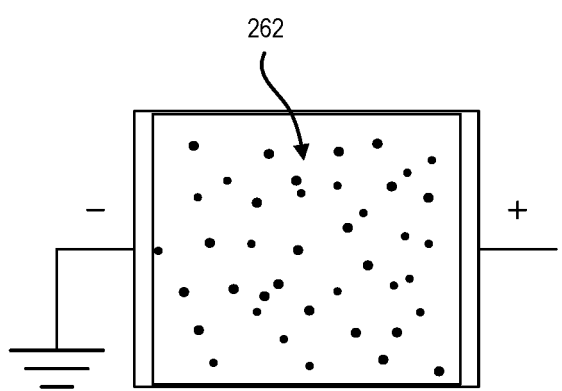
FIG. 4A illustrates an electro-rheological fluid before experiencing an electric field, in accordance with various embodiments.
Figure 4B:
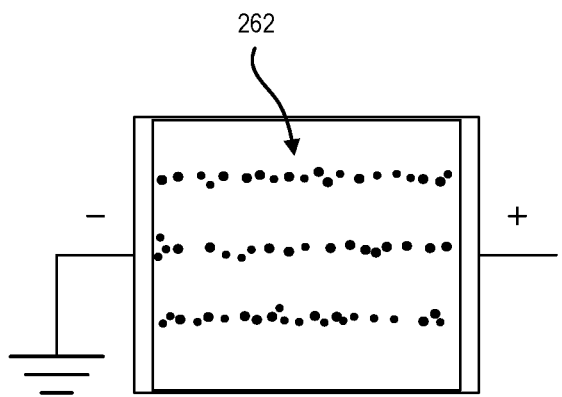
FIG. 4B illustrates an electro-rheological fluid after experiencing an electric field, in accordance with various embodiments.

In various embodiments, a fluid 262 is disposed in a cavity 260 defined between the shaft 206 and the roller cylinder 202. In various embodiments, the fluid 262 may comprise an electro-rheological fluid. In this regard, the fluid 262 may be configured to change viscosity in response to a change in electric field. For example, with brief reference to FIG. 4A, when the fluid 262 is free of an electric field (e.g., FIG. 4A), the fluid behaves like a Newtonian fluid, whereas when the fluid 262 is subjected to an electric field (e.g., FIG. 4B), the particles form a chain like structure, which may either increase or decrease a viscosity of the fluid. In various embodiments, the fluid 262 may be a positive electro-rheological fluid or a negative electro-rheological fluid.

In various embodiments, by varying the electric field between an anode in the plurality of anodes 252 and a cathode in the plurality of cathodes 254, the viscosity of the fluid 262 which contacts a respective rotor disk in the plurality of rotor disks 246 between the anode and cathode may be varied, thereby varying a coefficient of friction experienced by the respective rotor disk. In this regard, in accordance with various embodiments, a braking force may be varied by the braking arrangement 240 in response to a weight of the cargo (e.g., cargo 16 from FIG. 1).

In various embodiments, the types of electrodes in the plurality of electrodes 250 and a distance between cathodes and anodes may be sized and configured based on the fluid 262. For example, different types of electro-rheological fluids may work with more or less electrodes in the plurality of electrodes 250 and/or a greater or lesser distance between cathodes and electrodes, which would be recognized by one skilled in the art. In various embodiments, the electrodes may be electrically coupled to a power source. In various embodiments, as disclosed further herein, the power source may be internal to the brake roller assembly 200, such as via piezoelectric plates or the like. In various embodiments, the power source may include the PDU (e.g., PDUs 28 from FIG. 2), or any other power source known in the art.

In various embodiments, the first electromagnetic shield 241 and the second electromagnetic shield 249 may be disposed at axially opposite ends of the axle 230 and coupled to the axle 230. The electromagnetic shields, 241, 249 may at least partially block the electric field between electrodes in the plurality of electrodes to ensure the electric field effects the fluid 262 adjacent to the plurality of rotor disks 246.

Although illustrated as including skewed rollers 244, the brake roller assembly 200 may not include skewed rollers 244, in accordance with various embodiments. For example, all of the friction experienced by the plurality of rotor disks 246 may be via the fluid 262, in accordance with various embodiments. When the plurality of skewed rollers 244 are utilized in the brake roller assembly 200, a number of rollers may be reduced relative to typical brake roller assemblies, in accordance with various embodiments. In this regard, the plurality of skewed rollers 244 would only be applying a portion of the friction experienced by the plurality of rotor disks 246 and the fluid would be supplying the remaining friction experienced by the rotor disks 246.

In various embodiments, the shaft 206 comprises at least one aperture 207. The at least one aperture 207 may be configured to receive wiring therethrough to be coupled to the plurality of electrodes 250. In various embodiments, the wiring may be routed through the shaft 206 to a respective power source, such as a PDU (PDUs 28 from FIG. 1), an auxiliary power unit (APU), or the like.

Figure 5:
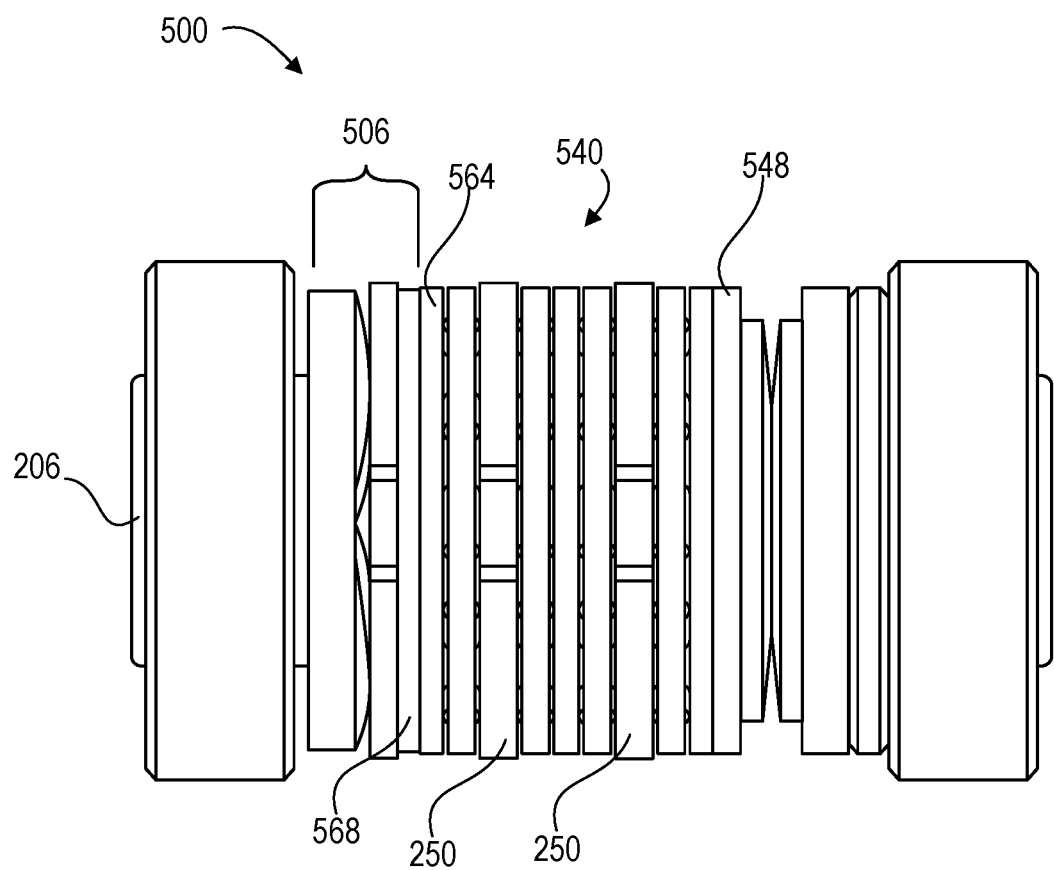
FIG. 5 illustrates a front view of a portion of a brake roller assembly, in accordance with various embodiments.

Referring now to FIG. 5, front view of a portion of a brake roller assembly 500 with an internal power source is illustrated, in accordance with various embodiments. In various embodiments, the brake roller assembly 500 is in accordance with the brake roller assembly 200 except as described further herein. In various embodiments, the brake roller assembly 500 includes a proximal stator plate 564 and a distal stator plate 548, each stator plate made of piezoelectric material. In various embodiments, the brake roller assembly 500 further comprises a slider disk assembly 506. In various embodiments, the slider disk assembly 506 comprises a cam. A "cam," as disclosed herein, refers to a rotating or sliding piece in a mechanical linkage used to transform rotatory motion into liner motion. In accordance with various embodiments, the piezoelectric material of the brake roller assembly 500 is in operable communication with the shaft 206 and the roller cylinder 202 (shown in FIG. 2) such that relative rotational motion between the shaft 206 and the roller cylinder 202 causes cyclic stress in the piezoelectric material, thereby generating electrical energy.

The cyclic-braking force generated by rotation of roller cylinder 202 deforms the piezoelectric material of proximal stator plate 564 and the distal stator plate 548 to generate electrical energy. Stated differently, the axial movement of a slider disk 568 of the slider disk assembly 506 during rotation of the roller cylinder (e.g., roller cylinder 202 from FIG. 3) causes a deformation of the piezoelectric material of distal stator plate 548 and proximal stator plate 564. Stated yet another way, the piezoelectric material of distal stator plate 548 and proximal stator plate 564 deforms in response to changes in thickness of braking arrangement 540. In the state of maximum thickness, the deformation of the piezoelectric material of distal stator plate 548 and/or proximal stator plate 564 are maximum. In the state of minimum thickness, the deformation of the piezoelectric material of distal stator plate 548 and proximal stator plate 564 are minimum. In this regard, as the cyclic-brake force develops through each rotation of the roller cylinder from 0° to 360°, the piezoelectric material will generate electrical energy pulse. The magnitude of electrical pulse generated is directly proportional to the mechanical deformation of the piezoelectric material of distal stator plate 548 and proximal stator plate 564.

In various embodiments, the electrical pulse generated from piezoelectric material of the proximal stator plate 564 and the distal stator plate 548 may be used to supply the electrical energy to the plurality of electrodes 250. In this regard, the power source for the brake roller assembly 500 may be internal to the brake roller assembly 500, in accordance with various embodiments.

Figure 6:
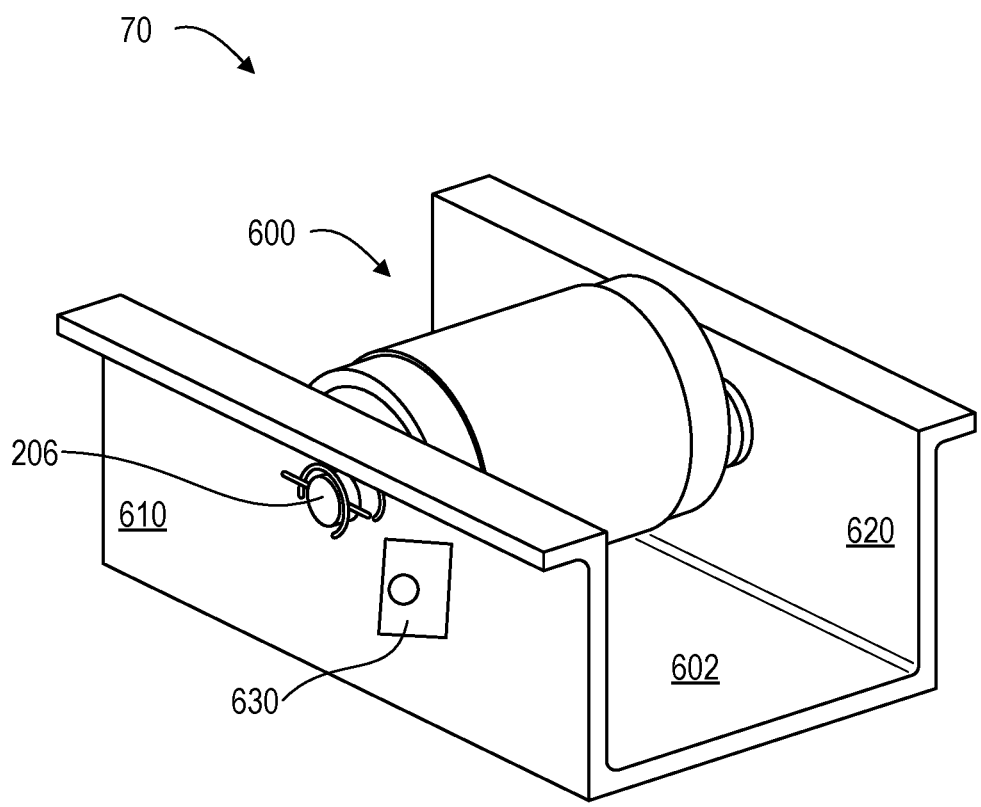
FIG. 6 illustrates a variable braking system, in accordance with various embodiments.

Referring now to FIG. 6, a variable braking system 70 is illustrated in accordance with various embodiments. The variable braking system 70 includes a tray 602 having a first rail 610 and a second rail 620, a brake roller assembly 600, and a load cell 630. In various embodiments, the brake roller assembly 600 may be in accordance with the brake roller assembly 200 or the brake roller assembly 500. In various embodiments, the shaft 206 of the brake roller assembly 600 is coupled to the first rail 610 and the second rail 620. In various embodiments, the load cell 630 may be coupled to the tray 602. In various embodiments, the load cell 630 may be disposed proximate the tray. In various embodiments the load cell 630 is configured to measure a weight of a respective cargo (e.g., cargo 16 from FIG. 1) during loading or unloading of the respective cargo. In various embodiments, the load cell 630 may be in communication with a controller, and the controller may be configured to vary a voltage supplied to the plurality of electrodes in the brake roller assembly 600. In this regard, a braking force may be varied based on a weight of a respective cargo (e.g., cargo 16 from FIG. 1.

Figure 7:
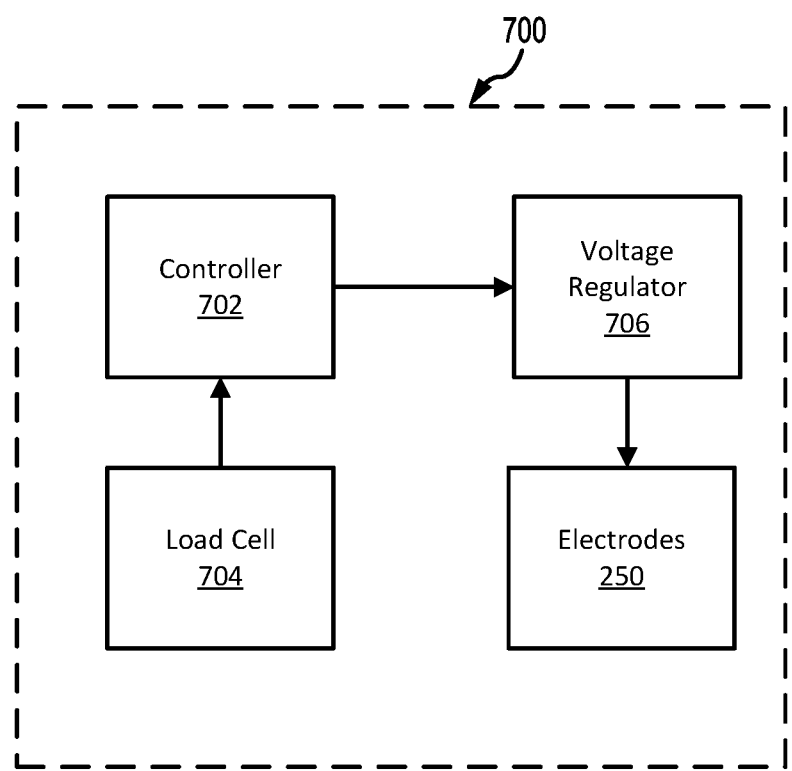
FIG. 7 illustrates a control system for the variable braking system, in accordance with various embodiments.

In various embodiments and with additional reference to FIG. 7, a schematic block diagram of a control system 800 for brake roller assembly 600 is illustrated. Control system 700 includes a controller 702 in electronic communication with a load cell 704, a voltage regulator 706, and the plurality of electrodes 250 in the brake roller assembly 600 from FIG. 6. In various embodiments, controller 702 may be integrated into computer systems onboard aircraft 10 from FIG. 1. In various embodiments, controller 702 may be configured as a central network element or hub to access various systems, engines, and components of control system 700. Controller 702 may comprise a network, computer-based system, and/or software components configured to provide an access point to various systems, engines, and components of control system 700. In various embodiments, controller 702 may comprise a processor. In various embodiments, controller 702 may be implemented in a single processor. In various embodiments, controller 702 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 702 may comprise a processor configured to implement various logical operations in response to execution of instructions, for example, instructions stored on a non-transitory, tangible, computer-readable medium configured to communicate with controller 702.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 702 may be in electronic communication with load cell 704. Load cell 704 may be disposed in tray 602 from FIG. 6. Load cell 704 may comprise any load cell known in the art, such as a compression load cell, or the like. Load cell 704 may be configured to measure a weight of cargo (e.g., cargo 16 from FIG. 1). Load cell 704 may be configured to transmit measurements to controller 702, thereby providing the measured weight of the cargo to controller 702.

In various embodiments, controller 702 may receive the weight measurement from the load cell prior to the cargo reaching the brake roller assembly 600. In response to the weight measurement, the controller 702 may calculate a voltage to supply to the plurality of electrodes in the brake roller assembly 600. In various embodiments, the voltage may be calculated based on a desired viscosity of a fluid (e.g. fluid 262) disposed in the brake roller assembly 600 to achieve a desired brake force against the cargo. In various embodiments, the calculated voltage may be supplied to the voltage regulator with a command to supply the voltage to the plurality of electrodes 250. In various embodiments, the voltage regulator may be configured to supply the voltage to the plurality of electrodes in the brake roller assembly. In response to receiving the voltage, the fluid (e.g., fluid 262 from FIG. 3) disposed in the brake roller assembly (e.g., brake roller assembly 600 from FIG. 6) may either increase or decrease in viscosity based on the desired viscosity of the fluid. In this regard, a brake force disposed on the cargo may be variable based on a weight of the cargo. In various embodiments, by varying the brake force based on the weight of the cargo, wear of the brake roller assembly 600 may be greatly reduced relative to typical, non-variable, braking systems. In various embodiments, by varying the brake force based on the weight of the cargo, higher brake forces may be applied to heavier cargo, resulting in a more efficient braking system relative to typical braking systems.

In various embodiments, a switch may be disposed between the voltage regulator 706 and the plurality of electrodes 250. In this regard, a unidirectional bearing from typical brake roller assemblies may be eliminated by controlling the power supply via the switch.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A brake roller assembly, comprising:
   a shaft;
   a first roller bearing coupled to the shaft and disposed at a first axial end of the shaft;
   a second roller bearing coupled to the shaft and disposed at a second axial end of the shaft;
   a roller cylinder disposed radially outward of the first roller bearing and the second roller bearing;
   a cavity defined between the shaft and the roller cylinder, wherein the cavity is configured to receive a fluid; and
   a braking arrangement, including:
      a plurality of electrodes, and
      a plurality of rotor disks coupled to the roller cylinder, each rotor disk in the plurality of rotor disks disposed between an anode in the plurality of electrodes and a cathode in the plurality of electrodes.

2. The brake roller assembly of claim 1, wherein the fluid is an electro-rheological fluid.

3. The brake roller assembly of claim 1, further comprising a stator disk having a piezoelectric material, wherein the piezoelectric material is configured to act as a power source for the plurality of electrodes.

4. The brake roller assembly of claim 1, wherein the anode and the cathode are configured to create an electric field therebetween.

5. The brake roller assembly of claim 1, further comprising a plurality of skewed rollers, wherein each rotor disk in the plurality of rotor disks is disposed between a first skewed roller in the plurality of skewed rollers and a second skewed roller in the plurality of skewed rollers.

6. The brake roller assembly of claim 1, further comprising an axle disposed radially outward from the shaft and radially inward from the roller cylinder.

7. The brake roller assembly of claim 6, wherein the plurality of electrodes are coupled to the axle.

* * * * *